UNITED STATES PATENT OFFICE.

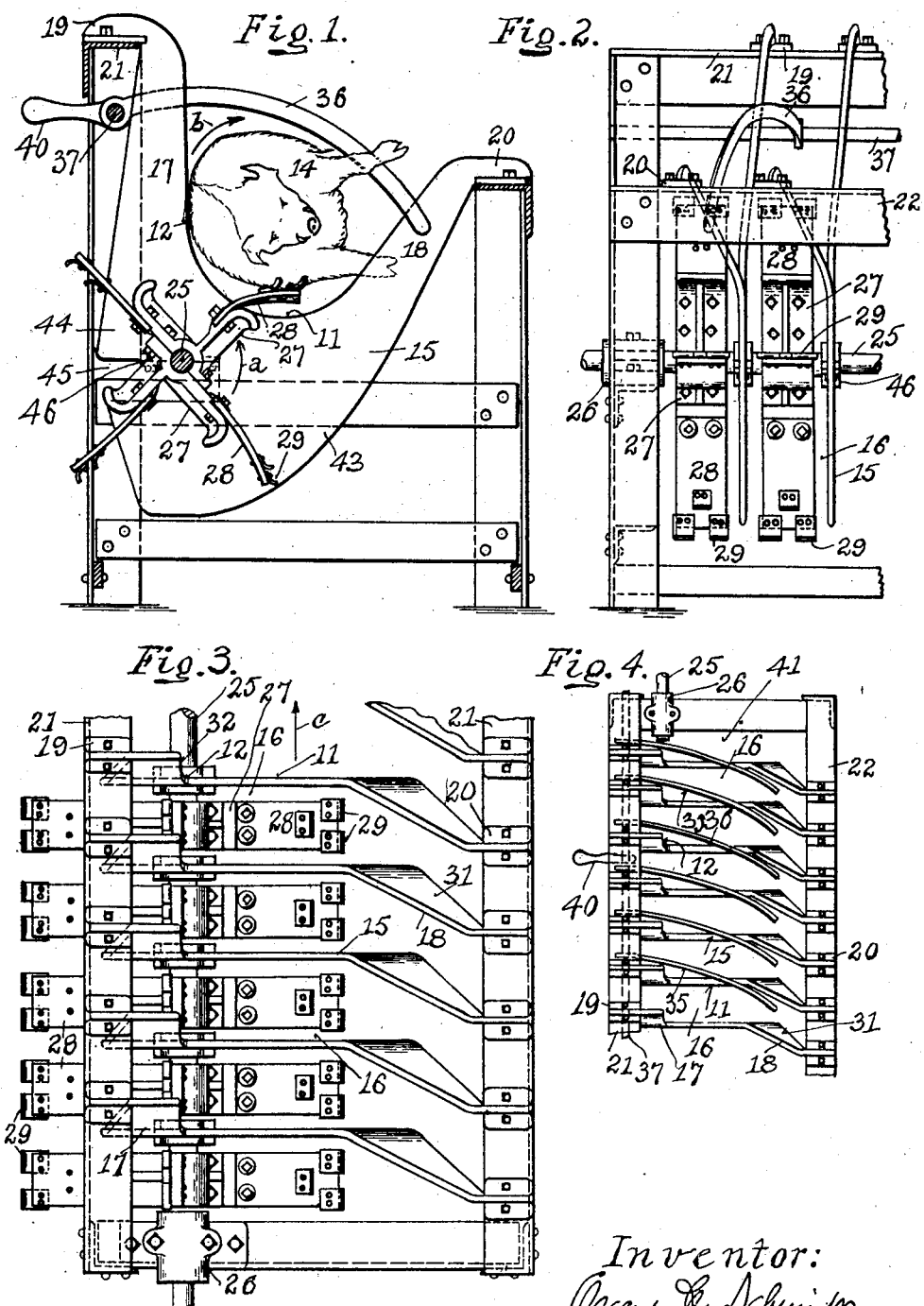

OSCAR C. SCHMIDT, OF CINCINNATI, OHIO, ASSIGNOR TO THE CINCINNATI BUTCHERS' SUPPLY COMPANY, OF CINCINNATI, OHIO, A CORPORATION OF OHIO.

CARCASS DEHAIRING AND CLEANING MACHINE.

1,388,899.  Specification of Letters Patent.  Patented Aug. 30, 1921.

Continuation of application Serial No. 121,671, filed September 22, 1916. This application filed December 17, 1917. Serial No. 207,582.

*To all whom it may concern:*

Be it known that I, OSCAR C. SCHMIDT, a citizen of the United States, residing at Cincinnati, in the county of Hamilton and State of Ohio, have invented certain new and useful Improvements in Carcass Dehairing and Cleaning Machines, of which the following is a specification.

The present application is a substitution for and continuation of my prior application for patent on improvements in hog scrapers, Serial No. 121,671, filed September 22, 1916, as to all matters common to said prior application and the present application, I having filed, of even date herewith, a written declaration of abandonment of said prior application but not of the invention therein shown and described, or any part of said invention.

This invention relates to carcass dehairing and cleaning machines, and is exemplified as employed for dehairing and cleaning carcasses, for instance, of hogs, such devices also being known as hog scrapers.

My invention is an improvement upon the carcass dehairing and cleaning machine shown, described and claimed in the joint application of myself and Charles G. Schmidt, executed of even date herewith, Serial No. 207,581, filed December 17, 1917.

In machines of the character mentioned as heretofore constructed, independent means have been employed, such as conveyers, traveling hooks and rotating supports, for conveying the carcass past the scraping or cleaning means. Independent means of this character are expensive to manufacture and install, and occupy considerable space, and are liable to get out of order. I avoid the objections to the use of such independent devices by so arranging and correlating the supporting means and the rotating scraping means for the carcass, that the carcass is not only scraped and cleaned, but also rolled, and fed lengthwise, solely by the scraping and cleaning means whose axes of rotation are located solely to one side of and lower than the carcass and the supporting means acting on the carcass, thereby dispensing with additional mechanisms.

It is the object of my invention therefore to provide a simplified machine in which such independent devices are dispensed with, and the parts of the machine so changed and related as to produce the effects desired.

It is the object of my invention further to provide novel means whereby the endwise movement of the carcass is controlled, so as to control the speed with which the carcass is moved endwise or discharged from the machine.

My improved machine is arranged to be made of indefinite length, so that one or more carcasses placed in end to end relation may be simultaneously operated on therein, and means are provided to control or retard the feeding movement of the carcass or carcasses, so that the desired number of carcasses may be simultaneously subjected to the dehairing and cleaning operations and the length of time to which the carcasses are subjected to such operations, may be controlled.

It is the object of my invention to so relate the carcass-support and rotary dehairing and cleaning means that the rotary dehairing and cleaning means act on the carcass from below in manner to relieve the pressure of the carcass on the supporting means for aiding in rotating the carcass during the dehairing or cleaning operation; further, to so locate the rotary dehairing or cleaning means with relation to the carcass supporting means that the axis of rotation of the rotary cleaning means is located to one side of the center of gravity of the carcass in the carcass-support and lower than the supporting portion of the carcass-support, in such manner that the action of the rotary dehairing or cleaning means is to raise the carcass and to move the same toward the vertical plane in which said axis of rotation is located, whereby relief of gravity pressure of the carcass upon the carcass-support is obtained and a rotary motion imparted to the carcass by the cleaning means; further, to so relate a carcass-support and rotary dehairing means that a combined orbital and rotary movement is imparted to the carcass; and, further, to provide means for imparting a lengthwise feeding movement to the orbitally moving and rotating carcass.

It is the object of my invention further to provide a limiting part located at that side of the carcass-support at which the axis of rotation of the cleaning means is located acting as a stop for the carcass against which the same is rotated by the rotary dehairing or cleaning means; further, to provide novel supporting means for the carcass so shaped that coaction between the rotating carcass and said supporting means acts to move the carcass lengthwise during rotative movement thereof; further, to provide novel means for spirally moving the carcass; and, further to provide a carcass-support and rotatable dehairing or cleaning means for the carcass, the axis of rotation of which is located solely at one side of the carcass-support and outside of and lower than the carcass supporting portion thereof, and acting with centrifugal force on the carcass to impart a rotary and orbital movement to the carcass.

The invention will be further readily understood from the following description and claims, and from the drawings, in which latter:

Figure 1 is a vertical section of my improved device taken on the section line 1—1 of Fig. 2.

Fig. 2 is a side elevation of the same, partly broken away.

Fig. 3 is a plan view of the same, partly broken away, with the hold-down bars removed; and, Fig. 4 is a reduced plan view of my improved device, partly broken away, showing the end thereof opposite to the end shown in Fig. 3, and showing the hold-down bars, but omitting the rotary cleaning devices.

The carcasses are scalded before being received in my improved machine. This scalding is for the purpose of facilitating removal of the hair and is accomplished in a suitable scalding tank which contains hot water.

My improved machine, in its present exemplification, comprises a carcass supporting means, having a carcass receiving depression 11 therein and a rotatable dehairing and cleaning means which has its axis of rotation at one side of and lower than said depression, whereby the action of the rotary dehairing and cleaning means is to relieve the gravity pressure of the carcass upon the carcass supporting face of the carcass-support and to rotate the carcass, the carcass-support being preferably further provided with a lateral wall 12.

The arrangement is preferably such that the carcass is urged about the axis of rotation of the rotating dehairing and cleaning devices in an orbital path which is limited by said wall for aiding in the rotating movement of the carcass and determining the position of the carcass during such rotating movement.

I have exemplified the supporting means for the carcass, shown at 14, as comprising bars 15 having spaces 16 between the same, the respective bars being provided with the depressions 11, preferably in alinement with each other for forming a trough, on the carcass supporting face of which the carcass is received. The wall of the depression is extended upwardly as shown by the wall 12 formed on the upward extensions 17 of the bars. The bars are exemplified further as having extensions 18 at the opposite side of the depression, the extensions 17 and 18, being provided with supporting lugs 19, 20, by means of which the bars are supported on cross-girts 21 and 22 of the frame of the machine.

The dehairing and cleaning means are exemplified as a rotatable scraping means comprising a shaft 25, which is journaled in bearings 26 on the frame. Scraping devices rotate with the shaft, and in the present exemplification comprise rigid arms 27 which extend preferably radially from the shaft and carry arms 28 provided with suitable scrapers 29 of metal or other material, arranged to act with a scraping action on the carcass for dehairing or cleaning the same, The arms 28 are somewhat flexible, and are preferably resilient, and extend outwardly to have the desired actions on the carcass, aided by the fact that the dehairing and cleaning means are caused to rotate rapidly whereby the dehairing and cleaning devices act with centrifugal force on the carcass.

The axis of rotation of the rotary cleaning means is preferably located outside the carcass supporting portion of the carcass support, to one side of the center of gravity of the carcass when supported in the carcass support, and lower than the carcass supporting wall of the depression of the carcass-support. The construction and relation of the parts is such, preferably, that when the arms of the cleaning means rotate past the carcass supporting portion of the carcass-support, the outer portions of said rotating means only contact the carcass, exemplified as the scrapers and flexible portions of the arms, the outer ends of the rigid portions or spiders of the arms passing the wall of the carcass supporting depression adjacent to but preferably lower than said wall. The said outer ends preferably reach through the spaces 16 across the median portion of the carcass so as to also act on the side of the carcass removed from the axis of rotation of the scraping means.

The action is such, in the present exemplification, that the scrapers are drawn across the body of the carcass with a movement acting to raise the carcass for relieving the gravity pressure of the carcass upon the wall of the depression and to move the carcass in an orbit about the rotating dehairing and cleaning means and against the limiting wall, limiting the movement of the carcass in its orbit, whereby a rotary movement is imparted to the carcass by the dehairing and cleaning means.

The rotation of the rotating dehairing and cleaning means is quite rapid, so that the actions of the scraping means on the carcass follow each other in rapid sequence for maintaining the hog in substantially raised or pressure relieved relation during action of the scrapers for dehairing the carcass and continuously rotating the carcass.

A suitable number of the arms is combined in a set, the respective sets of arms operating in the respective spaces between adjacent bars.

The shaft 25 is rotated by suitable means in the direction of the arrow $a$, causing the scraper arms to move against the carcass from below, so that the carcass is continuously rolled over and tumbled about in the trough, whereby by reason of close contact by the scrapers with the carcass, the hair is effectually removed.

The resistance between the scrapers and the carcass is greater than the resistance between the carcass and its support, owing to the relation and action of the parts, resulting in rotative movement of the carcass.

Endwise movement is also preferably imparted to the carcass during rotation thereof, whereby the carcass is advanced toward one end of the trough and finally discharged through said end, the arrangement being such, preferably, that the length of the trough and the numbers of sets of the cleaning devices coacting therewith, are sufficient to effect dehairing and cleaning of the carcass by the time the discharge of the carcass takes place.

The endwise movement of the carcass during the cleaning thereof is, in the present exemplification, obtained by inclined contact parts with which the carcass, for instance, the legs, shoulders, hips or other parts of the carcass, are arranged to make contact for being advanced by the inclines of said inclined parts. In the present exemplification the bars 15 are provided with such inclined faces, shown at 31 and at 32, the inclined faces 31 being formed by inclining the extensions 18 in one direction with relation to the carcass supporting depression, the inclined faces 32 being formed by inclining the extensions 17 of said bars in the opposite direction.

The limbs of the carcass, for example, when extending in one direction, during rotation of the carcass, make contact with the inclined faces 31 during downward movement of said limbs, and when extending in the opposite direction, said limbs are arranged to make contact with the inclined faces 32 during upward movement of said limbs, these contacts urging a lengthwise movement of the carcass, so that while the carcass is caused to rotate, an endwise movement is also imparted thereto, causing the movement of the carcass to simulate a screw motion or helical path. The direction of rotation of the carcass is indicated by the arrow $b$, and the axial direction of movement of the carcass is indicated by the arrow $c$.

The edges of the bars may be described as forming parts of an incomplete worm conveyer, or screw thread, which advances from one end of the bars to the other end thereof.

In the present exemplification of my invention, the bars are shown approximately U-shaped and rigidly connected at their ends to the cross-girts 21, 22, of the frame on which they are supported.

Suitable means may be provided, however, for retaining the carcass in the dehairing apparatus, accomplished preferably by a controlling means acting retardingly on the carcass counter to the advancing effect produced by the inclined faces, said controlling means being exemplified as a bar 36, of which a suitable number may be employed. The bars are rigidly connected to a rocker-rod 37 which is journaled in the frame. The bars 36 are exemplified as adapted to rest loosely upon the carcass.

These bars are preferably inclined in a direction similar to the inclines of the inclined faces 31. As, however, the bars 36 act on the parts of the carcass at the opposite sides of said parts from that at which the inclined faces 31 act thereon, the tendency is to retard the lengthwise movement of the carcass. The inclined faces of the bars 36 act counter to the inclined faces 31 and 32.

Referring to Fig. 4, it will be seen that if the limbs of the carcass contact the rear faces 31 to advance the carcass in the direction of the arrow $c$, that these same limbs will, in the upward portions of their paths, contact the forward faces 35 of the inclined bars 36 to counter-act the advancing movement previously imparted. The bars 36 are arranged to be moved into or out of range of the carcass by suitable means, exemplified as an operating handle 40 fixed to the rocker-rod 37. When the rocker-rod 37 is rocked to raise the bars 36, the bars are moved out of operative relation with the carcass for enabling the inclined faces 31 and 32 to produce their full advancing effect upon the carcass in order that the carcass may be readily discharged through the end space 41 of the frame.

The carcasses may be discharged directly upon the finishing bench by the action of the machine, so that no intermediate special means are required to effect this transition.

The charging of the carcass may be accomplished through the other end of said frame axially into the forward end of the carcass-support, or, if desired, the carcass may be charged into the carcass-support from the side of the latter.

The carcass-support may be of a length permitting it to simultaneously contain several carcasses end to end, the length of the carcass-support and the numbers of sets of cleaning devices acting on the carcass being sufficient to properly clean the carcasses without the retarding controlling means, or said controlling means may be employed, for producing a continuous operation in which the carcasses are successively moved lengthwise of the carcass-support and discharged one after the other out of the discharging end of the latter.

The bars 15 are extended downwardly and laterally, as shown at 43, 44, these extensions being respectively provided with recesses 45, in which the shaft 25 is received, the lateral extension being selectively provided with bearings 46 for the shaft. The extensions form guides for guiding the legs of the carcass, and prevent stoppage of rotation of the carcass or injury to the legs of the carcass by the catching of the legs between the rotating dehairing or cleaning means and the supporting means for the carcass. These extensions further provide partitions forming spaces or compartments in which the scraping devices rotate, the scraping devices occupying sufficient of the width of the spaces to prevent a wedging of parts of the carcass between the rotating devices and the walls of said spaces, and at the same time forming spaces of sufficient depth between the bars and between adjacent scraping devices of the same set of scraping devices for accommodating the lengths of the legs of hogs of substantial size, in order to avoid bending or buckling of the legs and to permit the scraping devices to act resiliently on all parts of the hog to thoroughly dehair and clean the same.

Water may be sprayed over the carcass while the operation proceeds to keep the carcass wet and to wash off the hair and scurf loosened during the operation.

Having thus fully described my invention, what I claim as new and desire to secure by Letters Patent, is:

1. In a hog-scraper, the combination of hair-removing means, and stationary means to support a carcass while these hair-removing means act upon the carcass so as to remove the hair therefrom, said stationary means being so constructed that contact with them by the carcass as produced by the impact with the same of the hair removing means imparts also an endwise movement to the carcass past said hair-removing means.

2. In a hog-scraper, the combination of a rigidly connected support for the carcass occupying a permanent position, means for removing the hair from the carcass, and relatively stationary means on this support which together with the hair-removing means impart at the same time a lengthwise movement to the carcass.

3. In a hog-scraper, the combination of rigidly connected U-shaped bars arranged in spaced relation parallel to each other to form a trough-shaped support for carcasses, parts of these bars being laterally inclined all in the same direction, and hair-removing means operating in the spaces between the bars and adapted to rotate a carcass while cleaning it and to advance it at the same time lengthwise through the trough in consequence of the contact of the carcass with the inclined portions of the bars.

4. In a hog scraper, the combination of a trough-shaped support adapted to receive a carcass lengthwise, rotary hair-removing means operating in this support and below the carcass in a manner to cause the same to rotate while confined in said support and means forming rigidly connected parts of the support with which the rolling carcass is adapted to come in contact and whereby a lengthwise movement is imparted to the same.

5. In a hog-scraper, the combination of a rigidly connected support in form of a trough adapted to receive a carcass lengthwise, rotary hair-removing means operating in the trough and below the carcass therein and in a manner to cause the same to rotate while confined in said trough, means forming rigidly connected parts of this trough adapted to come in contact with the rolling carcass and causing the same to move also lengthwise toward one end of the trough, and means to control this endwise movement of the carcass.

6. In a hog-scraper, the combination of means adapted to remove the hair from a carcass while causing the same to roll about itself lengthwise, and a stationary rigidly connected support for the carcass so constructed that contact therewith while being rolled around thereon by the hair-removing means imparts also an endwise movement to said carcass.

7. In a hog-scraper, the combination of means adapted to remove the hair from a carcass while causing the same to rotate, and a trough-shaped support adapted to confine the carcass during this operation, said support consisting of rigidly connected spaced bars shaped to produce a screw-effect upon the rolling carcass whereby the same is caused to move gradually toward one end of the support.

8. In a hog-scraper, the combination of a frame, a series of bars rigidly connected thereto with spaces between them and shaped to form a carcass-support in form of a trough, an operating shaft supported outside of this trough, and scraper-arms arranged in sets mounted on this shaft and extending into the trough through the spaces between the bars, said bars being edgewise enlarged between these sets to form partitions between them.

9. In a hog-scraper, the combination of a rigid trough-shaped support adapted to receive a carcass lengthwise, rotary hair-removing means operating in this support and below the carcass in a manner to cause the same to rotate while confined in said support, said support comprising means with which the agitated carcass is adapted to come in contact and whereby a lengthwise movement is imparted to the same, and spaced bars mounted above the carcass and adapted to make adjustable contact with the same for the purpose of counteracting the lengthwise movement of the carcass.

10. In a hog-scraper, the combination of bars arranged in spaced relation to form a trough-shaped support for carcasses, parts of these bars being inclined, and hair-removing means operating in the spaces between the bars and adapted to rotate a carcass while cleaning it and to advance it at the same time lengthwise through the trough by reason of its contact with the inlined portions of the bars.

11. In a hog-scraper, the combination of a rigid trough-shaped support adapted to receive a carcass lengthwise, rotary hair-removing means operating in this support in a manner to cause the same to rotate, and means provided in this support with which the rolling carcass is adapted to come in contact and whereby a lengthwise movement is imparted thereto.

12. In a hog-scraper, the combination of hair-removing means, rigidly connected means to support a carcass while these means act upon the same and provided with means coöperating with the hair-removing means to cause the carcass to move endwise past said means.

13. In a carcass dehairing machine, the combination of a carcass-support, and a rotatable dehairing means having its axis of rotation lower than the carcass supporting portion of said carcass-support, said rotatable dehairing means comprising an unyielding inner portion and yieldable outer portions, said yieldable outer portions comprising scraping means, and the path of movement of the peripheral portion of said unyielding portion extending within that projection of the carcass-supporting face of said carcass-supporting portion which is lengthwise of the carcass position and with said yieldable outer portions arranged thereby to rotate the carcass.

14. In a hog-scraper, the combination of hair-removing means adapted to rotate a carcass while cleaning it, and spaced bars arranged to from a support for the carcass while the same is being cleaned, said bars being so shaped as to cause a carcass to move also in a direction parallel to the axis of its rotation.

15. In a hog-scraper, the combination of a set of spaced bars arranged to form a carcass-support, a shaft extending lengthwise of this support, scraper-arms mounted on this shaft and operating in the support, and bearings for the shaft provided on these bars between adjacent scraper-arms to support the shaft between its ends.

16. As an article of manufacture, a curved bar for the carcass-support of a hog-scraper of the type herein described and in which a scraper shaft is used, a set of bars being relatively arranged to form said support, and a bearing provided on this bar and adapted to support the shaft between its ends.

17. In a machine of the character described, the combination of a frame, a series of U-shaped bars connected therewith in spaced relation and curved to form a concave support adapted to contain the carcass, hair-removing means operating in said support and extending across the supporting face of said support from outside said supporting face, said frame having a discharge opening, and means for moving said carcass endwise during rotation thereof for discharging said carcass through said opening.

18. In a machine of the character described, the combination of a frame, a series of U-shaped bars connected therewith in spaced relation and curved to form a concave support adapted to contain the carcass, hair-removing means operating in said support and extending across the supporting face of said support from outside said supporting face, said frame having a discharge opening, means for moving said carcass endwise during rotation thereof for discharging said carcass through said opening, and means controlling the discharge of the carcass.

19. In a machine of the character described, the combination of U-shaped bars arranged in spaced relation substantially parallel to each other to form a trough-shaped support for the carcass, said bars having substantially parallel laterally inclined portions, and dehairing means operating in the spaces between said bars to rotate a carcass while cleaning the same, and constructed and arranged whereby to advance the carcass lengthwise of the trough in consequence of the contact of the carcass with said inclined portions during rotation of the carcass.

20. In a machine of the character described, the combination of U-shaped bars arranged in spaced relation substantially parallel to each other to form a trough-shaped support for the carcass, said bars having substantially parallel laterally inclined portions, and dehairing means operating in the spaces between said bars to rotate a carcass while cleaning the same, constructed and arranged whereby to advance the carcass lengthwise of the trough in consequence of the contact of the carcass with said inclined portions during rotation of the carcass, and means for controlling said advancing movement.

21. In a machine of the character described, the combination of bars having spaces between them and arranged to form a trough-shaped support for the carcass, rotary dehairing means comprising a shaft and scraper-arms extending therefrom, the axis of rotation of said rotary dehairing means being lower than and to one side of said trough-shaped support, said bars provided with extensions extending downwardly and laterally for forming spaces in which said arms move, and constructed and arranged to form compartments between said extensions and adjacent arms in which the legs of the carcass are guidingly received.

22. In a machine of the character described, the combination of carcass supporting means having a carcass supporting depression, a rotary cleaning means having an axis of rotation outside said carcass supporting depression, said rotary cleaning means comprising cleaning devices reaching through said carcass supporting means and thereby acting on the carcass from outside said carcass supporting depression, and means feeding said carcass lengthwise.

23. In a machine of the character described, the combination of a rotatable dehairing means comprising yieldable dehairing devices, a support having openings through which said dehairing devices act on the carcass, and means for feeding the carcass endwise.

24. In a machine of the character described, the combination of a rotatable dehairing means comprising yieldable dehairing devices, a support having openings through which said dehairing devices act on the carcass, means for feeding the carcass endwise, and retarding means for counteracting said feeding means.

25. In a machine of the character described, the combination of a rotatable dehairing means comprising yieldable dehairing devices, a support having openings through which said dehairing devices act on the carcass, means for feeding the carcass endwise, retarding means for counteracting said feeding means, and means for adjusting said retarding means.

26. In a machine of the character described, the combination of carcass supporting means having a carcass supporting depression, a rotatable dehairing means having an axis of rotation to the side of and lower than said depression, said rotatable dehairing means comprising dehairing devices acting through the carcass supporting wall of said depression on the carcass for rotating the same, and inclined parts arranged to be contacted by the carcass for feeding the same lengthwise during rotation thereof.

27. In a carcass dehairing machine, the combination of a carcass-support, and rotatable dehairing means having their axes of rotation solely at one side of the center of gravity of the carcass in said support and lower than the carcass position, said rotatable dehairing means comprising scraping means reaching past the vertical plane of said center of gravity for acting on the carcass simultaneously at both sides of said center of gravity with a raising and dragging movement to rotate said carcass.

28. In a carcass dehairing machine, the combination of a carcass-support, rotatable dehairing means having their axes of rotation solely at one side of the center of gravity of the carcass in said support and lower than the carcass position, said rotatable dehairing means comprising scraping means reaching past the vertical plane of said center of said gravity for acting on the carcass with a raising and dragging movement to rotate said carcass, and means whereby to feed said carcass lengthwise during rotation thereof.

29. In a carcass dehairing machine, the combination of a carcass-support, rotatable dehairing means having their axes of rotation solely at one side of the center of gravity of the carcass in said support and lower than the carcass position, said rotatable dehairing means comprising scraping means reaching past the vertical plane of said center of gravity for acting on the carcass with a raising and dragging movement to rotate said carcass, and means whereby to feed said carcass lengthwise during rotation thereof, said machine provided with a discharge opening through which the carcass is discharged by said lengthwise movement thereof.

30. In a carcass dehairing machine, the combination of a carcass-support, rotatable dehairing means having their axes of rotation solely at one side of the center of gravity of the carcass in said support and lower than the carcass position, said rotatable dehairing means comprising scraping means reaching past the vertical plane of said center of gravity for acting on the carcass with a raising and dragging movement to rotate said carcass, means whereby to feed said carcass lengthwise during rotation thereof, said machine provided with a discharge opening through which the carcass is discharged by said lengthwise movement thereof, and means for controlling said lengthwise movement.

31. In a carcass dehairing machine, the combination of a carcass-support having a carcass supporting portion provided with openings therethrough, and a rotatable dehairing means having an axis of rotation to the side of and lower than said carcass supporting portion and comprising arms the inner portions of which are comparatively rigid and the outer portions of which are comparatively yieldable, said yieldable portions comprising scraping means, the outer portions of said relatively rigid portions being so positioned as to coincide substantially with the vertical plane in which the axis of the carcass position is located when said outer ends approach said carcass-support, whereby said yieldable portions and scraping means approach beyond said vertical plane for contacting the other side of the carcass with a raising and dragging movement for rotating the carcass.

32. In a carcass dehairing machine, the combination of a carcass-support having a carcass supporting portion provided with openings therethrough, a rotatable dehairing means having an axis of rotation to the side of and lower than said carcass supporting portion and comprising arms the inner portions of which are comparatively rigid and the outer portions of which are comparatively yieldable, said yieldable portions comprising scraping means, the outer portions of said relatively rigid portions being so positioned as to coincide substantially with the vertical plane in which the axis of the carcass position is located when said outer ends approach said carcass-support, whereby said yieldable portions and scraping means approach beyond said vertical plane for contacting the other side of the carcass with a raising and dragging movement for rotating the carcass and imparting orbital movement thereto, and means for limiting the orbital path of said movement, said last-named means located in a vertical plane substantially coincident with the vertical plane in which said axis of rotation is located.

33. In a machine of the character described, the combination of means for rotating the carcass, and a plurality of sets of inclined guides with relation to which the carcass is rotated, said respective sets of inclined guides having oppositely facing contact-faces arranged to be contacted by the carcass during rotation thereof for respectively feeding said carcass lengthwise and retarding said lengthwise feeding movement.

34. In a machine of the character described, the combination of means for rotating the carcass, a plurality of sets of inclined guides with relation to which the carcass is rotated, said respective sets of inclined guides having oppositely facing contact-faces arranged to be contacted by the carcass during rotation thereof for respectively feeding said carcass lengthwise and retarding said lengthwise feeding movement, and means for shifting said retardingly acting inclined guides relatively to the carcass-position.

35. In a machine of the character described, the combination of carcass supporting means having carcass supporting faces, and rotatable cleaning devices coacting therewith, said rotatable cleaning devices having an axis of rotation at the side of and lower than said carcass supporting faces, said rotatable cleaning devices reaching through said carcass supporting means to the other side of the carcass position for acting on both sides of the carcass with a raising dragging movement to rotate said carcass.

36. In a machine of the character described, the combination of carcass supporting means having carcass supporting faces, rotatable cleaning devices coacting therewith, said rotatable cleaning devices having an axis of rotation at the side of and lower than said carcass-supporting faces, said rotatable cleaning devices reaching through said carcass supporting means to the other side of the carcass position for acting on the carcass with a raising dragging movement to rotate said carcass, and means whereby said carcass is fed lengthwise during rotation thereof.

37. In a machine of the character described, the combination of carcass supporting means having carcass supporting faces, rotatable cleaning devices coacting therewith, said rotatable cleaning devices having an axis of rotation at the side of and lower than said carcass supporting faces, said rotatable cleaning devices reaching through said carcass supporting means to the other side of the carcass position for acting on the carcass with a raising dragging movement to rotate said carcass, means whereby said carcass is fed lengthwise during rotation thereof and mean for controlling said lengthwise feeding movement.

38. In a carcass dehairing machine, the combination of a carcass-support comprising a carcass supporting depression, a wall extending upwardly therefrom, and rotatable carcass dehairing means having an axis of rotation at the side of said depression and lower than said depression, said carcass dehairing means comprising dehairing devices having an orbit extending past said carcass supporting depression and said wall, and arranged whereby to contact the carcass for rotating the same and moving the same with said orbit, said wall limiting said orbital movement.

39. In a carcass dehairing machine, the combination of a carcass-support comprising a carcass supporting depression, a wall extending upwardly therefrom, rotatable carcass dehairing means having an axis of rotation at the side of said depression and lower than said depression, said carcass dehairing means comprising dehairing devices having an orbit extending past said carcass supporting depression and said wall, and arranged whereby to contact the carcass for rotating the same and moving the same with said orbit, said wall limiting said orbital movement, and means whereby axial movement is imparted to the carcass during rotation thereof.

40. In a carcass dehairing machine, the combination of a carcass-support comprising a carcass supporting depression, a wall extending upwardly therefrom, rotatable carcass dehairing means having an axis of rotation at the side of said depression and lower than said depression, said carcass dehairing means comprising dehairing devices having an orbit extending past said carcass supporting depression and said wall, and arranged whereby to contact the carcass for rotating the same and moving the same with said orbit, said wall limiting said orbital movement, means whereby axial movement is imparted to the carcass during rotation thereof, and means for controlling said axial movement.

41. In a carcass dehairing machine, the combination of a carcass-support, and rotary dehairing means whose axes of rotation are solely at one side of the carcass position and acting solely from below upon the carcass, said rotary dehairing means acting to raise said carcass in an orbital path.

42. In a carcass dehairing machine, the combination of a carcass-support comprising a carcass positioning portion, and rotary dehairing means whose axes of rotation are solely lower than the carcass position and acting solely from below upon the carcass with a raising effect upon the carcass, said rotary dehairing means comprising dehairing devices movable across the middle part of said carcass positioning portion for contacting a substantial part of the carcass in similar directions at both sides of the middle line of said carcass positioning portion with a rotating and raising movement.

43. In a carcass dehairing machine, the combination of a carcass-support having a carcass supporting portion, rotary dehairing means, comprising yielding dehairing devices, said rotary dehairing means having substantially rigidly ascending portions extending under substantially the median portion of the carcass position and having a path of movement extending from below within said carcass supporting portion and acting to raise and to rotate said carcass, and said carcass rotated solely by said rotary dehairing means.

44. In a carcass dehairing machine, the combination of a carcass-support, rotary dehairing means whose axes of rotation are solely at one side of the center of gravity of the carcass and having substantially rigidly ascending portions extending under substantially the median portion of the carcass position and acting to raise and to rotate said carcass, said carcass rotated solely by said rotary dehairing means, and constructed and arranged to feed the carcass lengthwise during said rotation.

45. In a carcass dehairing machine, the combination of a carcass-support provided with a carcass receiving depression and a carcass contact face extending upwardly from one side of said depression, and a rotary dehairing means having its axis of rotation at the same side of said depression lower than said depression, said rotary dehairing means comprising dehairing devices acting upwardly on the carcass to relieve gravity pressure of said carcass on said carcass-support, and constructed and arranged whereby to move the carcass against said upwardly extending carcass contact face.

46. In a carcass dehairing machine, the combination of a carcass-support provided with a carcass receiving depression and a carcass contacting face extending upwardly from one side of said depression, and a rotary dehairing means having its axis of rotation at the same side of said depression lower than said depression, said rotary dehairing means comprising yielding dehairing devices acting upwardly on the carcass to relieve gravity pressure of said carcass on said carcass-support and move the same against said upwardly extending carcass contact face, said carcass-support and said rotary dehairing means constructed and arranged to feed the carcass lengthwise.

47. A hog cleaning machine comprising carcass positioning means and rotatable scraping devices located solely to one side of the carcass position arranged whereby to roll the carcass with a raising movement solely toward that side of the carcass at which said rotatable scraping devices are located.

48. In a carcass dehairing machine, the combination of rotary dehairing means, means constructed and arranged whereby to impart a combined rotary and orbital movement about said rotary dehairing means to the carcass during the dehairing operation, and means controlling said orbital movement.

49. In a carcass dehairing machine, the combination of rotary dehairing means, means constructed and arranged whereby to impart a combined rotary and axial and orbital movement about said rotary dehairing means to the carcass during the dehairing operation, and means controlling said orbital movement.

50. In a carcass dehairing machine, the combination of rotatable dehairing means, means constructed and arranged whereby to impart a combined spiral and orbital movement about said rotary dehairing means to the carcass during the dehairing operation, and means controlling said orbital movement.

51. In a machine of the character described, the combination of a trough-shaped support for the carcass comprising bars having spaces between them, rotary dehairing means comprising hub-portions and dehairing devices, said dehairing devices arranged to move transversely past the supporting faces of said bars, and extensions coacting with said bars extending downwardly and laterally within those projections of said hub-portions which are parallel with the axes of rotation of said rotary dehairing means whereby to include the lower range of movement of the carcass parts for forming spaces in which said dehairing devices move, and constructed and arranged to form compartments between said extensions and the dehairing devices moving therebetween in which the legs of the carcass are guidingly received to avoid injury of said legs.

52. In a carcass dehairing machine, the combination of a carcass support, and rotary dehairing means comprising dehairing devices, means for rotating said dehairing devices solely in one direction of rotation, said rotary dehairing devices acting through said support in similar directions throughout on the carcass and forming the sole moving means to rotate the carcass and adapted to raise the carcass and simultaneously rotate the same.

53. In a carcass dehairing machine, the combination of a carcass support, and rotary dehairing means comprising dehairing devices moving through said carcass support, said rotary dehairing means acting to raise said carcass and to simultaneously rotate the same, and constructed and arranged whereby to simultaneously feed the carcass endwise.

54. In a carcass dehairing machine, the combination of a carcass support, rotatable dehairing means comprising scraping means, means for rotating said rotatable dehairing means solely in one direction of rotation at both sides of and across the vertical plane of the center of gravity of the carcass on the carcass support for simultaneously acting on the carcass with a raising and dragging effect to rotate the carcass.

55. In a machine of the character described, the combination of a carcass support, and rotary cleaning means rotating solely in one direction of rotation and located solely below the carcass position of said support and forming the sole moving means to rotate the carcass and arranged to act on the lower face of the carcass in similar directions at both sides of the center of gravity of the carcass with a raising movement to rotate the carcass.

56. In a carcass dehairing machine, the combination of a carcass-support, a rotatable dehairing means having its axis of rotation lower than the carcass supporting portion of said carcass-support, said rotatable dehairing means comprising inner portions which are unyielding and outer portions which are yieldable, said yieldable portions comprising scraping means, the outer portions of said unyielding portions being spaced apart and so positioned with relation to said carcass supporting portion as to extend in their rotations within the projection, lengthwise of the carcass position, of the carcass supporting face of said carcass supporting portion and in connection with said yieldable portions to alternately raise and lower the carcass and simultaneously rotate the same during the dehairing operation.

In testimony whereof, I have hereunto signed my name in the presence of two subscribing witnesses.

OSCAR C. SCHMIDT.

Witnesses:
JAMES J. FITZPATRICK,
THERESA M. SILBER.